(12) United States Patent
Tsai

(10) Patent No.: US 7,104,927 B2
(45) Date of Patent: Sep. 12, 2006

(54) RIDING DEVICE

(75) Inventor: Shih-Chang Tsai, Tainan (TW)

(73) Assignee: Tonic Fitness Technology, Inc., Tainan Hsien (TW)

( * ) Notice: Subject to any disclaimer, the term of this patent is extended or adjusted under 35 U.S.C. 154(b) by 184 days.

(21) Appl. No.: 10/972,419

(22) Filed: Oct. 26, 2004

(65) Prior Publication Data

US 2006/0088808 A1 Apr. 27, 2006

(51) Int. Cl.
*A63B 22/00* (2006.01)

(52) U.S. Cl. .............................. 482/51; 472/95; 472/97

(58) Field of Classification Search .................. 482/51, 482/72; 472/95–97, 100–1, 130; 434/247, 434/29, 55; 446/396; 297/260.1–260.2
See application file for complete search history.

(56) References Cited

U.S. PATENT DOCUMENTS

| 1,991,011 | A | * | 2/1935 | Carniol | 104/60 |
| 3,997,979 | A | * | 12/1976 | Turner | 472/29 |
| 5,180,338 | A | * | 1/1993 | Pinto | 472/96 |
| 6,402,626 | B1 | * | 6/2002 | Beaty | 472/96 |
| 6,749,539 | B1 | * | 6/2004 | Hsieh | 482/51 |
| 6,866,594 | B1 | * | 3/2005 | Greenwood | 473/422 |
| 6,964,614 | B1 | * | 11/2005 | Tsai | 472/58 |
| 2002/0115536 | A1 | * | 8/2002 | Hojo et al. | 482/51 |

* cited by examiner

*Primary Examiner*—Stephen R. Crow
*Assistant Examiner*—Allana Lewin
(74) *Attorney, Agent, or Firm*—Bacon & Thomas

(57) ABSTRACT

A riding device includes a bottom base and an intermediate base pivotally positioned on the bottom base and having its front and rear end respectively and pivotally provided with two front and two rear swing arms. A seat plate positioned over the intermediate base has four corners with a connecting lug connected with the upper ends of the swing arms. A transmission unit fixed on the intermediate base has a motor for driving a first, a second and a third gear to rotate synchronously. A crank is secured on the shaft of the second gear. A pull rod is connected with the bottom base and also with the shaft of the third gear. The riding device of this invention can swing back and forth, swing up and down and swing left and right obliquely.

4 Claims, 12 Drawing Sheets

RIDING DEVICE

BACKGROUND OF THE INVENTION

1. Field of the Invention

This invention relates to a riding device, particularly to one able to simulate the movements of horse riding, having excellent effect on a user's health.

2. Description of the Prior Art

Generally, a rowing apparatus, a walking apparatus, a stationary bike and a riding device are fitness equipment having function of simulation. The riding device for simulating the movements of horse riding has the following advantages.

1. It has functions of consuming a user's superfluous calories and helping a user to keep fit.
2. The natural and regular movements of horse riding are able to improve such conditions as sore waist, aching back, headache, stiff neck and shoulder muscle tautness.
3. It helps to relax a person's muscle after he/she works for a long time and suffers from fatigue.
4. It has function of massaging a person's internal organs by means of vibration.
5. It has function of eliminating superfluous flesh of a user's lower abdomen and beautifying a user's buttocks.

Therefore, riding devices for simulating the movements of horse riding have been developed, such as the one disclosed in a Taiwan patent No. 1220389 (Japan patent application No. 2003-010291).

SUMMARY OF THE INVENTION

The objective of the invention is to offer a riding device having function of simulating the movements of horse riding, able to be actuated to swing back and forth, swing up and down and swing left and right obliquely.

The riding device in the present invention includes a bottom base, an intermediate base, a seat plate, a transmission unit and a pull rod combined together. The bottom base can be placed on a flat surface. The intermediate base has its front and rear end pivotally combined with the bottom base and has the opposite sides of its front and rear end respectively and pivotally connected with two front swing arms and two rear swing arms. The seat plate positioned over the intermediate base has its four corners respectively formed integral with a connecting lug extending downward and pivotally connected with the upper ends of the front and the rear swing arms of the intermediate base, letting the four corners of the seat plate held upward by the front and the rear swing arms. The seat plate is further fitted with a cushion on the topside for a user to sit thereon. The transmission unit fixed on the intermediate base is provided with a motor for driving a first, a second and a third gear to rotate synchronously. The second gear has one side of its shaft fixed with a crank for rotating together, and the crank has its extending end connected with a connecting rod, which has the other end pivotally connected with the pivotal joint of the swing arm of the intermediate base and the connecting lug of the seat plate to form a pivotal point. The pull rod has its lower end connected with a positioning point of the bottom base and its upper end connected with an eccentric portion of one end of the shaft of the third gear. The pull rod further has its upper and lower end respectively provided with a universal bearing for preventing the pull rod from rotating together with the third gear.

By so designing, the seat plate can be driven to swing back and forth, swing up and down and swing left and right obliquely.

BRIEF DESCRIPTION OF DRAWINGS

The invention will be better understood by referring to the accompanying drawings, wherein.

DETAILED DESCRIPTION OF THE PREFERRED EMBODIMENT

Figure 1:
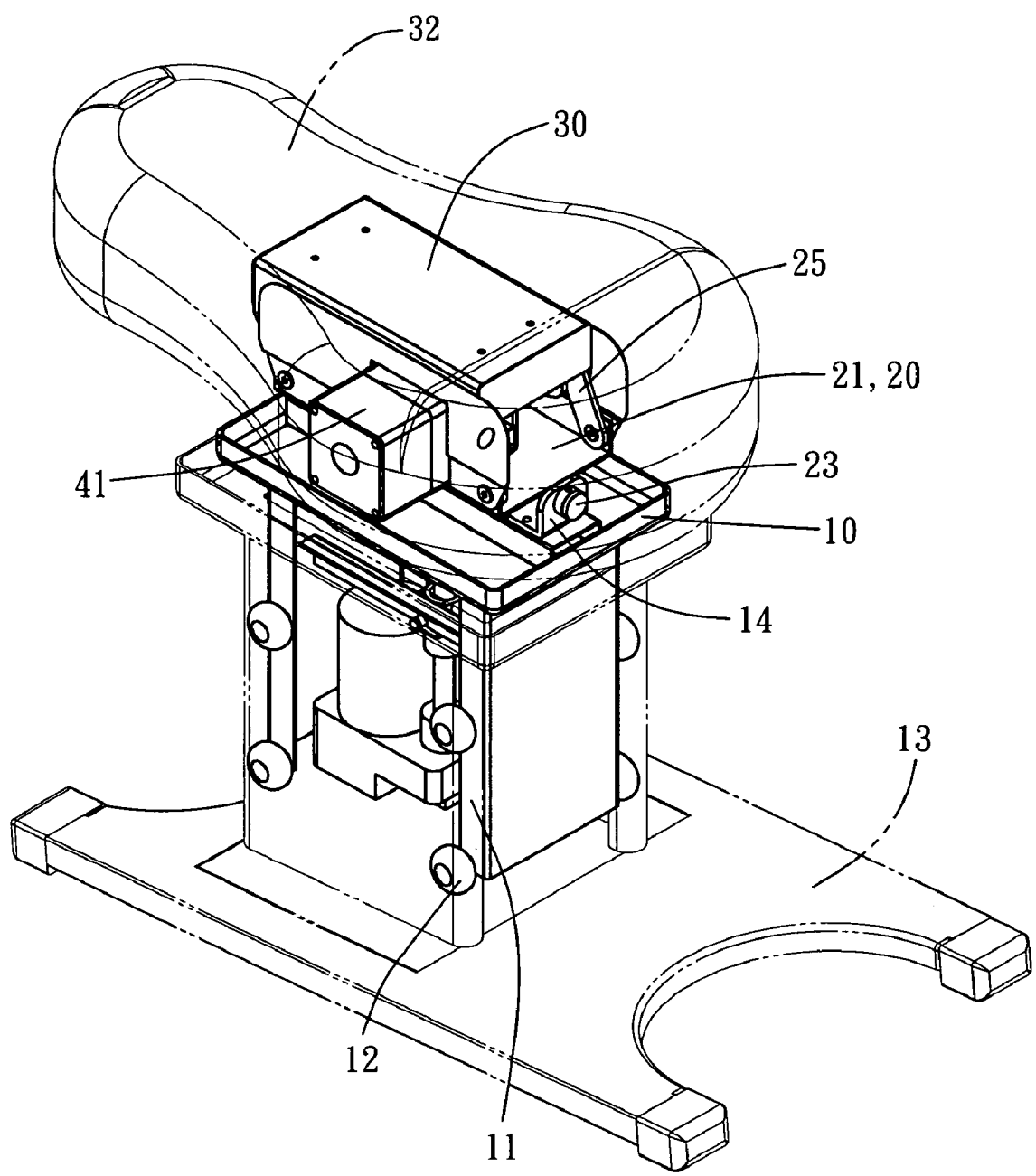
FIG. 1 is a first perspective view of a riding device in the present invention.
Figure 2:
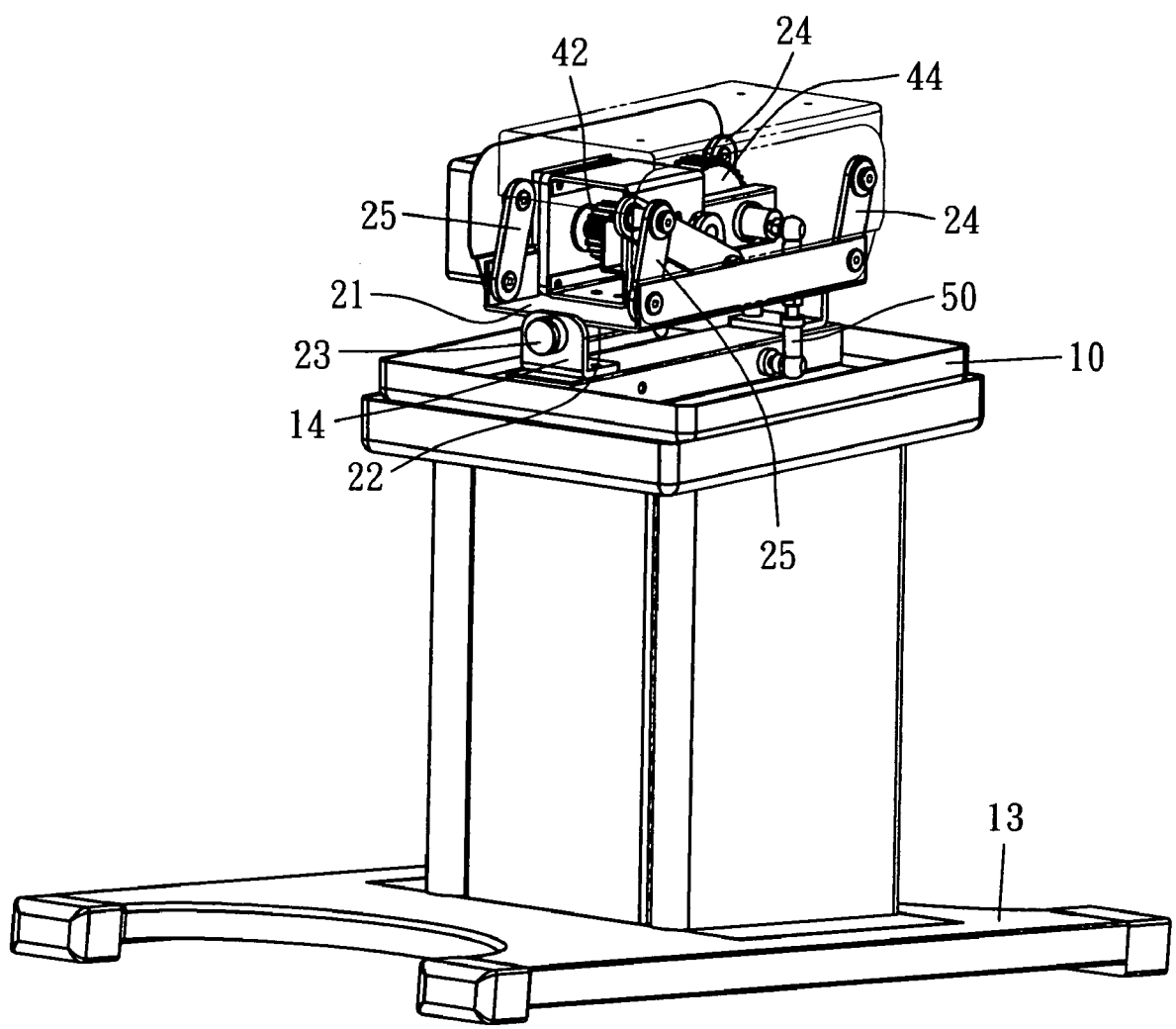
FIG. 2 is a second perspective view of the riding device in the present invention.

A preferred embodiment of a riding device in the present invention, as shown in FIGS. 1 to 4, includes a bottom base 10, an intermediate base 20, a seat plate 30, a transmission unit 40 and a pull rod 50 as main components combined together.

The bottom base 10 has its four corners respectively provided with a guidepost 11 extending downward and having the outer side pivotally fitted with guiding rollers 12. Thus, when the guide posts 11 are inserted in a bottom frame 13, the guiding rollers 12 of the guide posts 11 will push against the inner wall of the bottom frame 13 to be driven by a driving machine to slide and actuate the bottom base to move up and down to be adjusted in height so as to suit riders of different heights. The bottom base 10 further has the upper front and the rear sides of respectively fixed with an L-shaped combining plate 14 facing each other.

Figure 3:
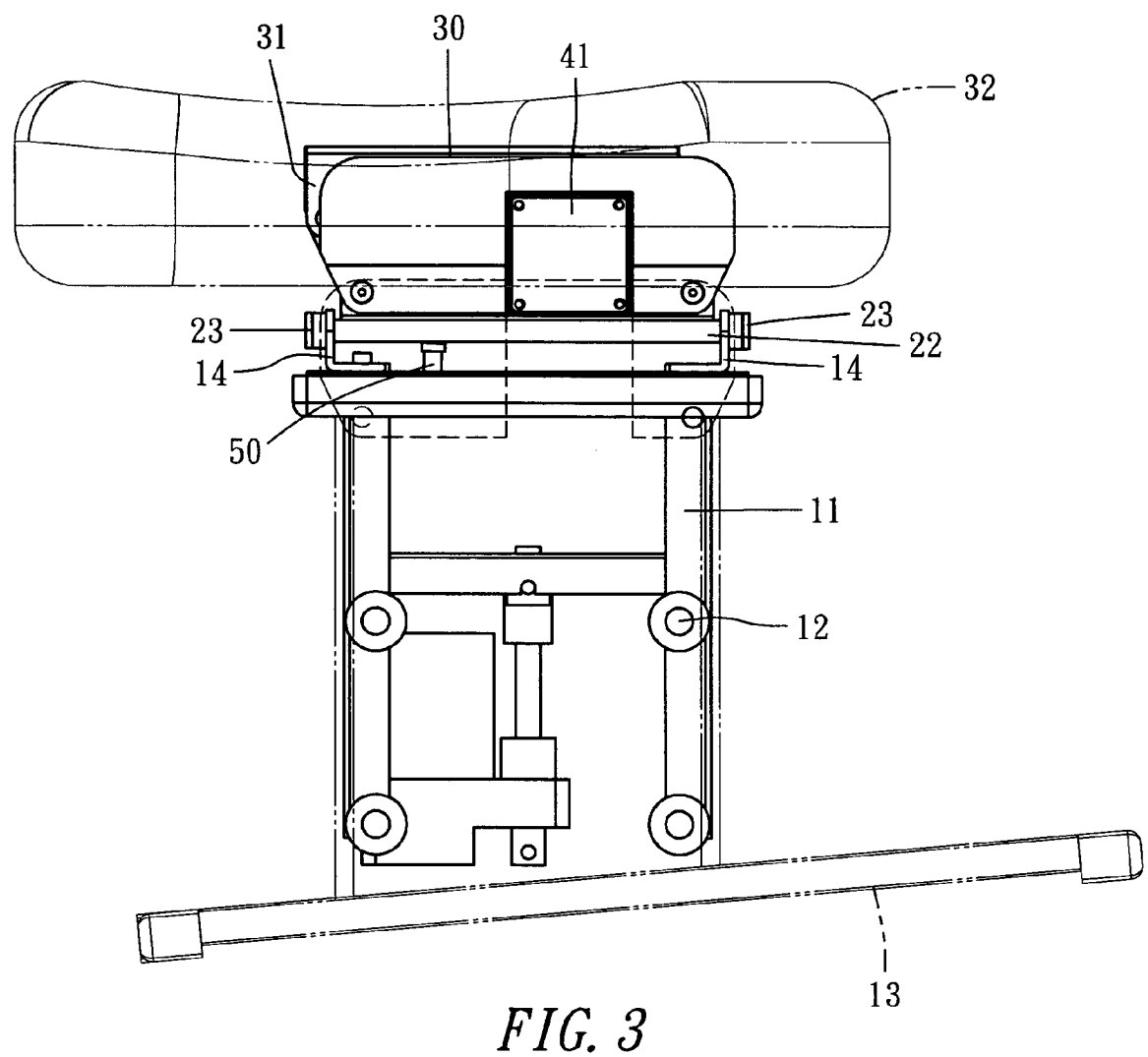
FIG. 3 is a side cross-sectional view of the riding device in the present invention.
Figure 4:
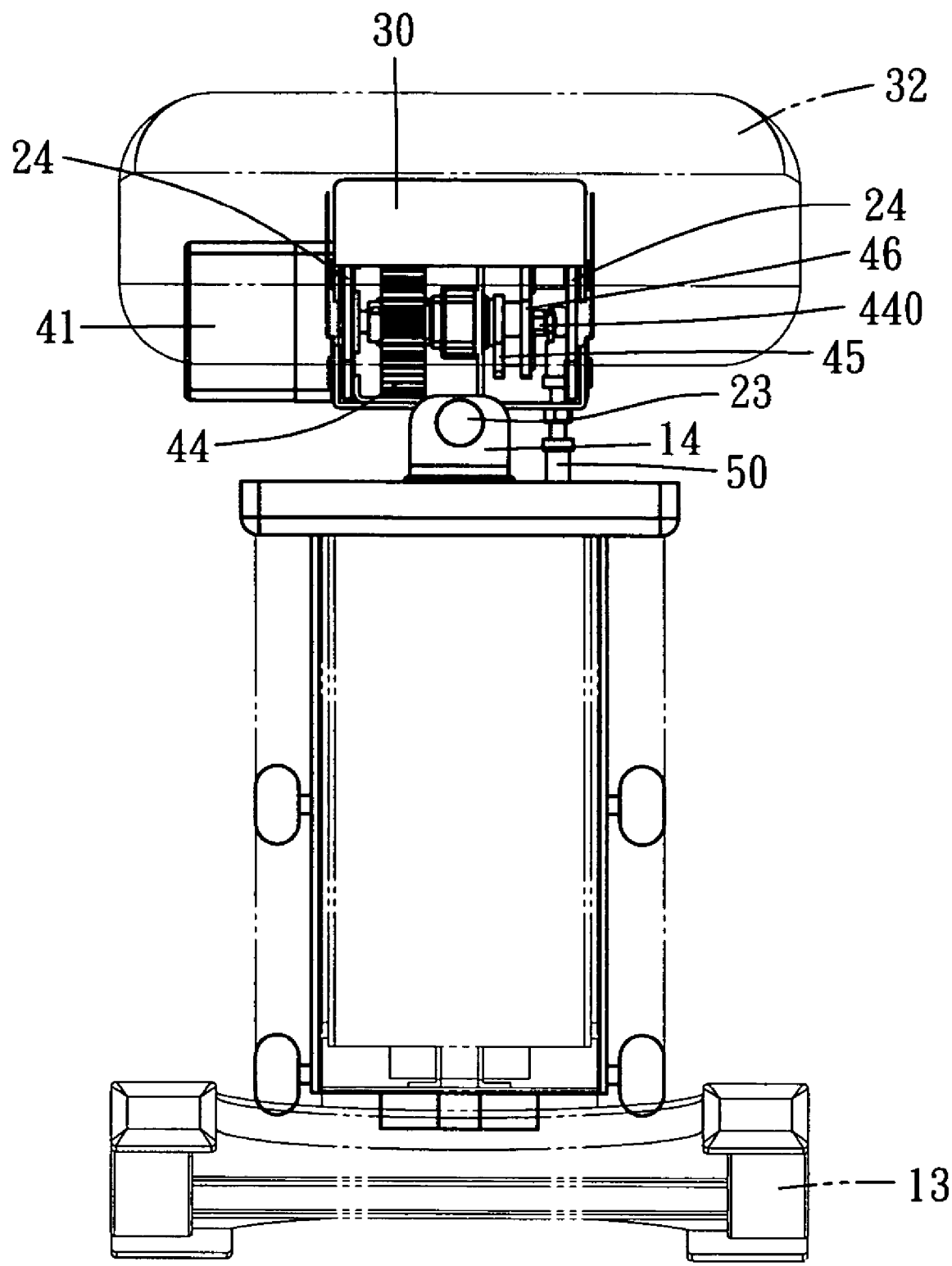
FIG. 4 is a cross-sectional view of the riding device in the present invention.

The intermediate base 20 pivotally combined on the bottom base 10 is provided at the bottom with a basic plate 21 having a lengthwise rod 22 formed integral under the central bottom, as shown in FIG. 3. The lengthwise rod 22 has its front and rear end respectively connected with the two combining plates 14 on the bottom base 10 by pivotal shafts 23. The basic plate 21 has the opposite sides of its front and rear end respectively and pivotally provided with two front swing arms 24 and two rear swing arms 25.

Figure 5:
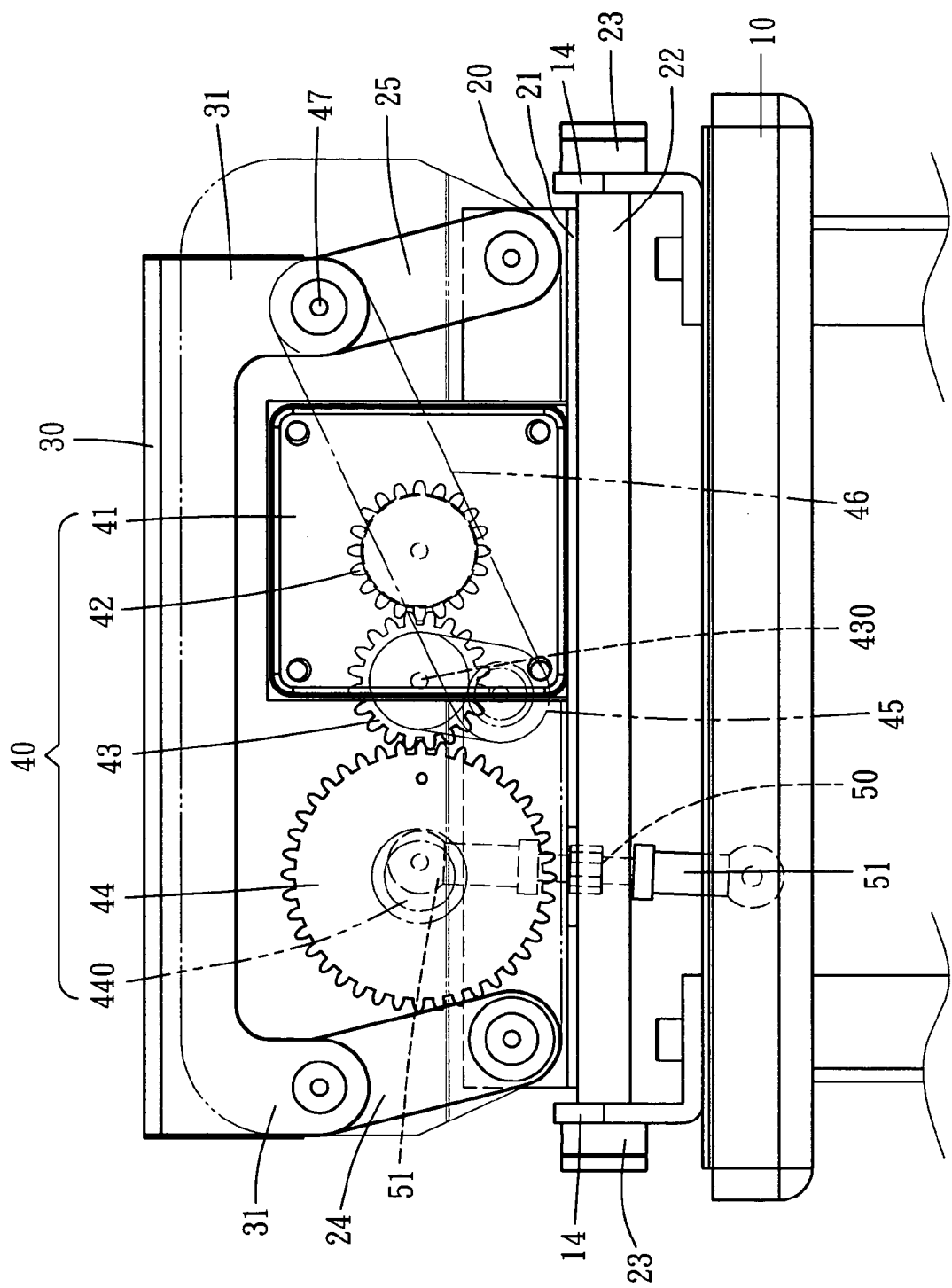
FIG. 5 is a side cross-sectional view of the riding device in the present invention, showing that the seat plate is actuated to swing back and forth and swing up and down when the shaft of a second gear is rotated for zero degree.
Figure 6:
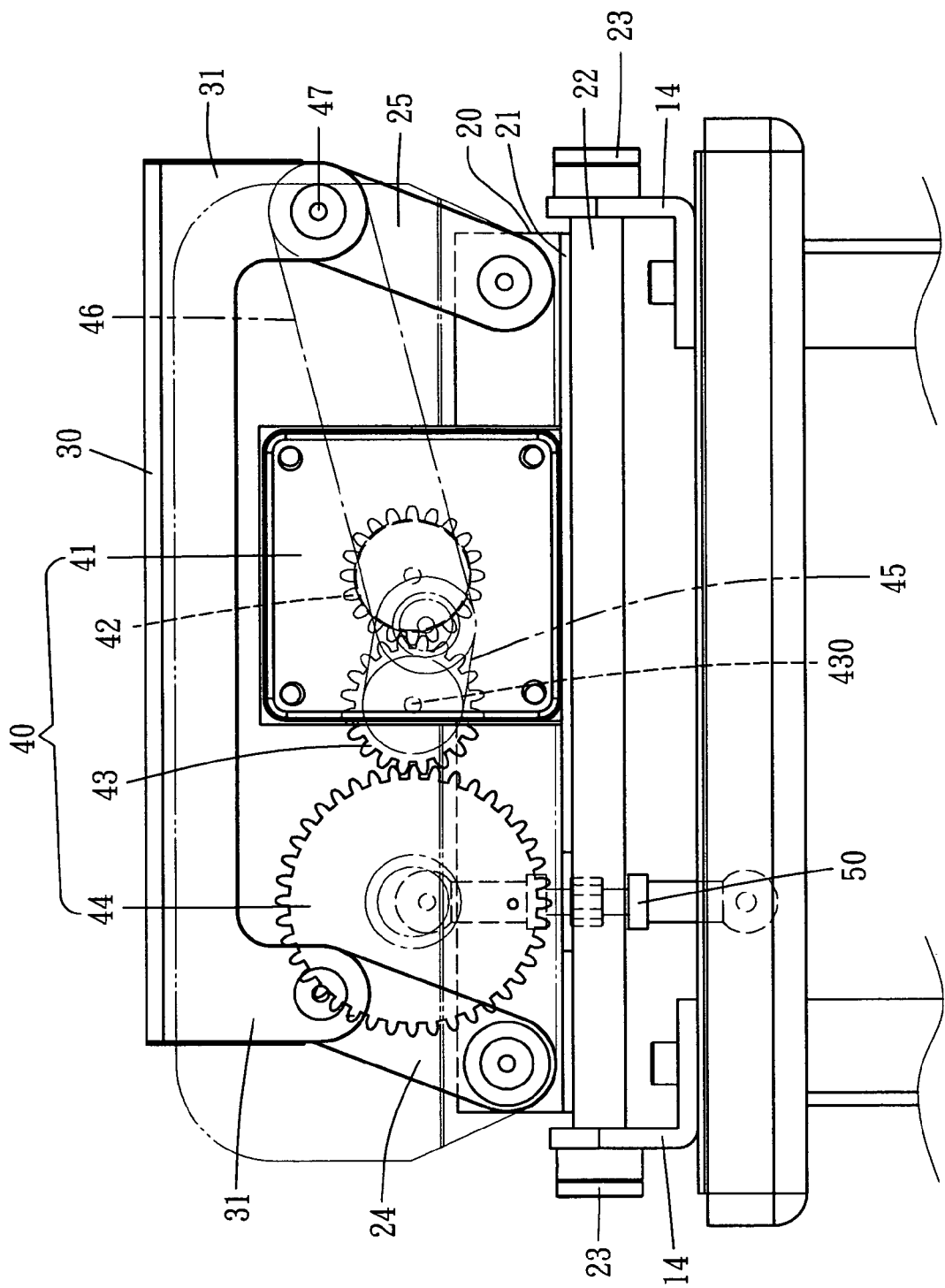
FIG. 6 is side cross-sectional view of the riding device in the present invention, showing that the seat plate is actuated to swing back and forth and swing up and down when the shaft of the second gear is rotated for 90 degrees.
Figure 7:
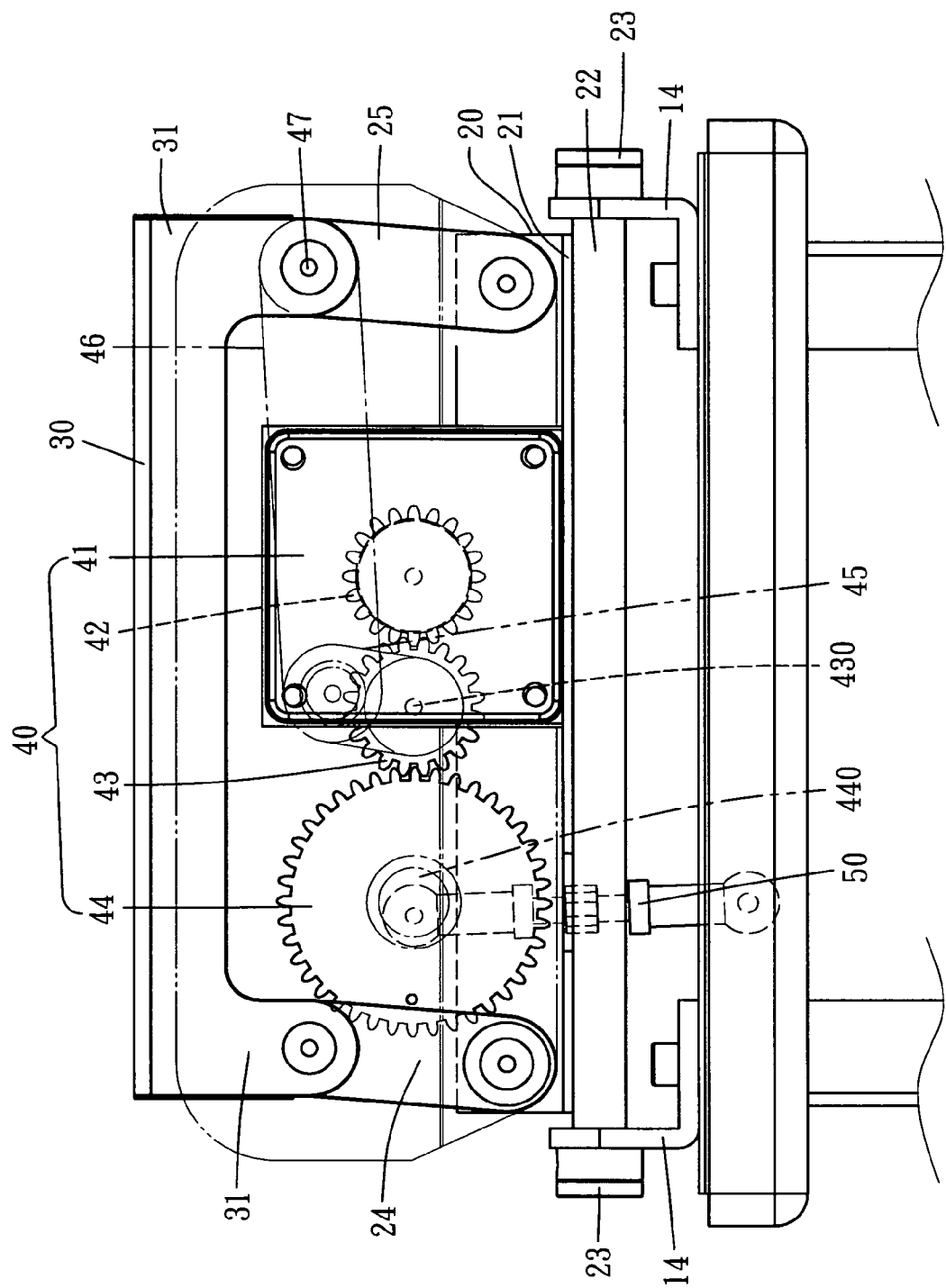
FIG. 7 is a side cross-sectional view of the riding device in the present invention, showing that the seat plate is actuated to swing back and forth and swing up and down when the shaft of the second gear is rotated for 180 degrees.
Figure 8:
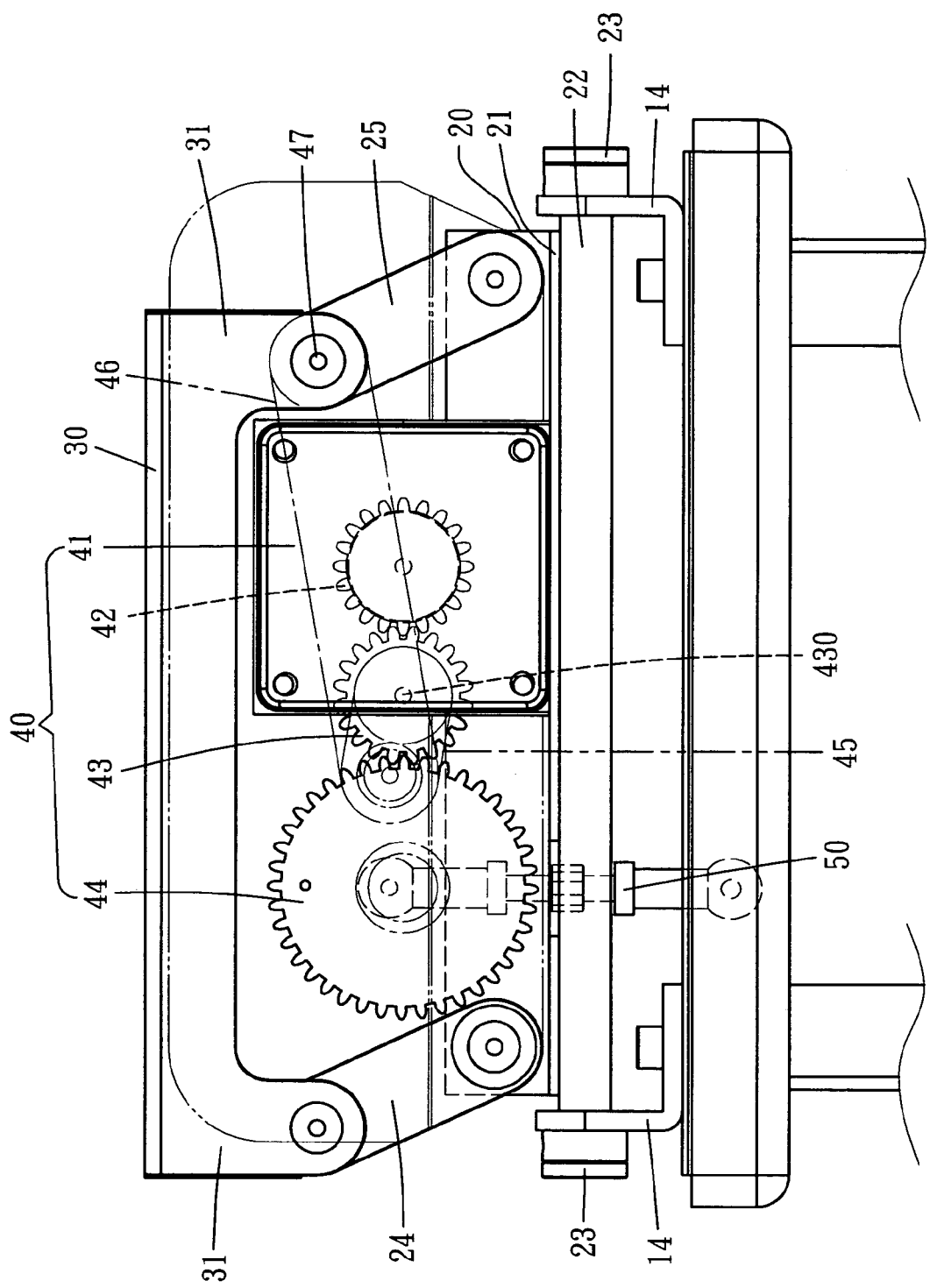
FIG. 8 is a side cross-sectional view of the riding device in the present invention, showing that the seat plate is actuated to swing back and forth and swing up and down when the shaft of the second gear is rotated for 270 degrees.
Figure 9:
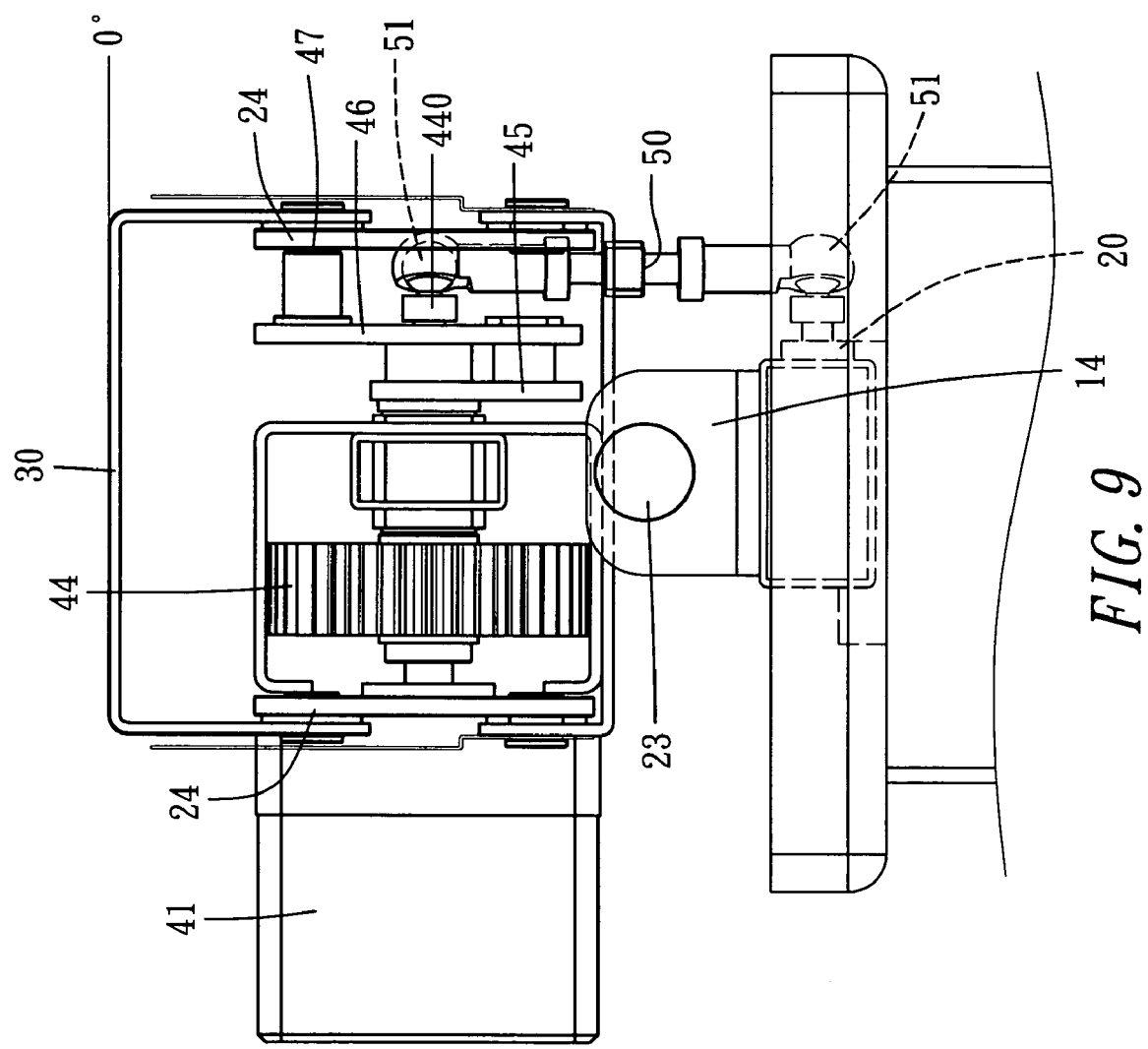
FIG. 9 is a cross-sectional view of the riding device in the present invention, showing that the seat plate is actuated to swing left and right obliquely when the shaft of a third gear is rotated for zero degree.
Figure 10:
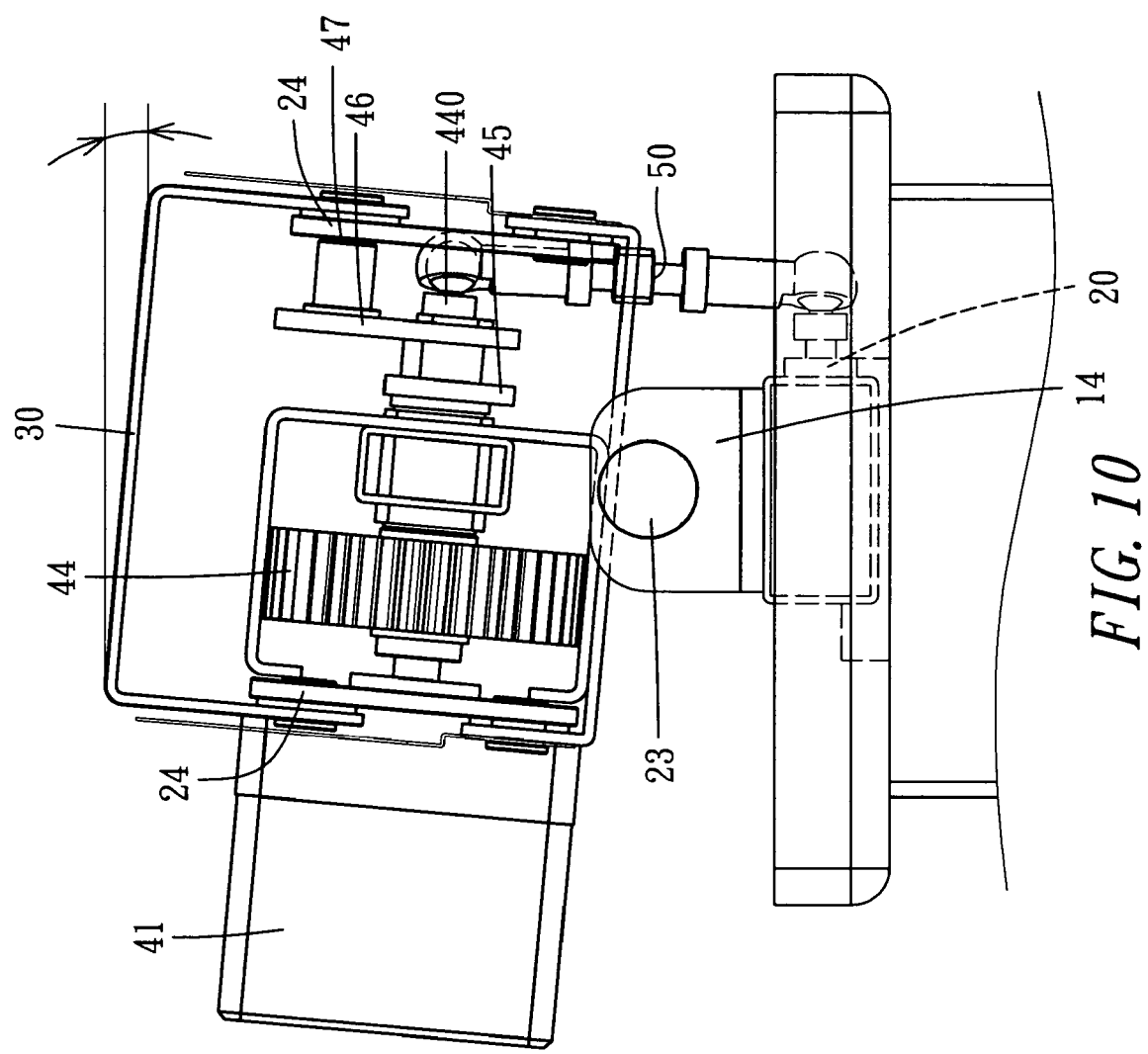
FIG. 10 is a cross-sectional view of the riding device in the present invention, showing that the seat plate is actuated to swing left and right obliquely when the shaft of the third gear is rotated for 90 degrees.
Figure 11:
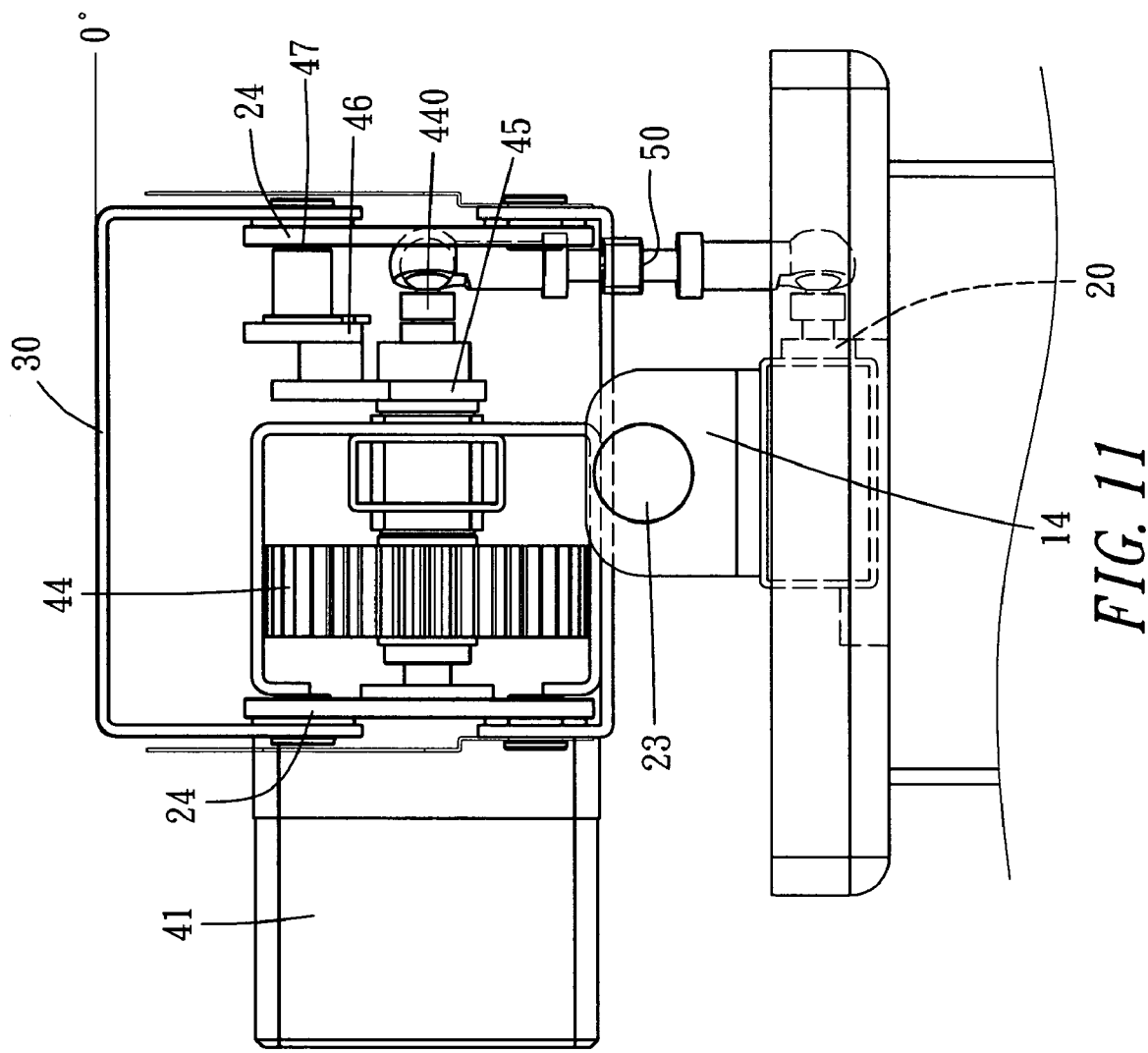
FIG. 11 is a cross-sectional view of the riding device in the present invention, showing that the seat plate is actuated to swing left and right obliquely when the shaft 440 of the third gear is rotated for 180 degrees.
Figure 12:
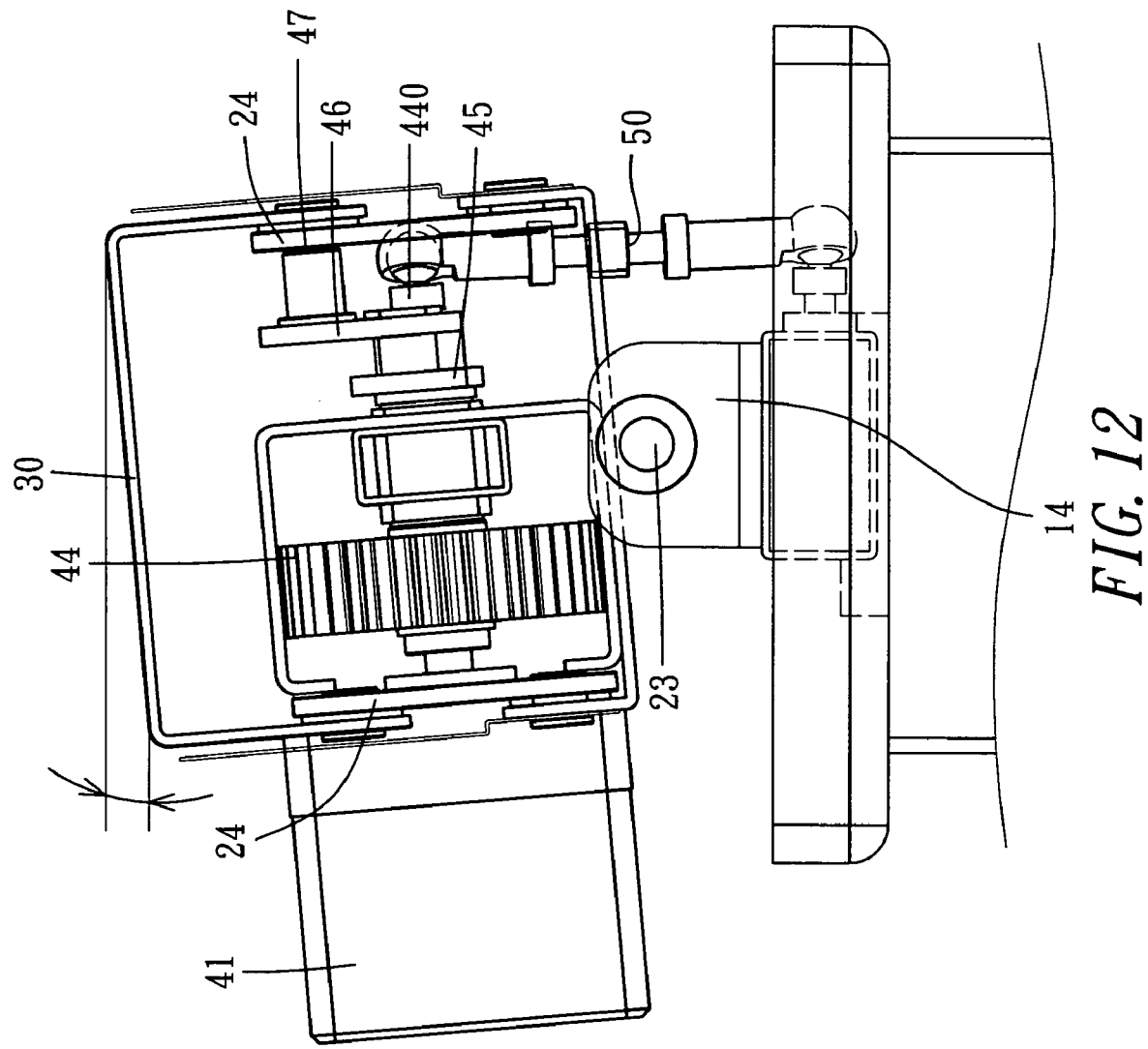
FIG. 12 is a cross-sectional view of the riding device in the present invention, showing that the seat plate is actuated to swing left and right obliquely when the shaft 440 of the third gear is rotated for 270 degrees.

The seat plate 30 positioned over the intermediate base 20, as shown in FIG. 5, has its four corners respectively provided with a connecting lug 31 extending downward. The four connecting lugs 31 have their lower ends respectively and pivotally connected with the upper ends of the front and the rear swing arms 24, 25, letting the four corners of the seat plate 30 held upward by the front and the rear swing arms 24, 25. The seat plate 30 further has its topside fitted with a cushion 32 for a user to sit thereon, as shown in FIG. 1.

The transmission unit 40 fixed on the intermediate base 20, as shown in FIG. 5, is provided with a motor 41 for driving a first gear 42, a second gear 43 and a third gear 44 to rotate synchronously. The gear ratio between the second and the third gear 43, 44 is one to two. A crank 45 is secured on one end of the shaft 430 of the second gear 43 for rotating together and has its extending end pivotally connected with a connecting rod 46, which has the other end connected with the pivotal joint of the rear swing arm 25 and the seat plate 30 to form a pivotal point 47. Thus, the second gear 43 can be driven to actuate the pivotal point 47 together with the seat plate 30 to swing back and forth and swing up and down by means of the crank 45 and the connecting rod 46.

The pull rod 50, as shown in FIG. 5, has its upper end connected with an eccentric portion of one end of the shaft 440 of the third gear 44 and its lower end connected with a positioning point of the bottom base. The pull rod 50 further has its upper and lower turning end respectively provided with a universal bearing 51 to prevent the pull rod 50 from rotating together with the shaft 440 of the third gear 44. Thus, when the shaft 440 of the third gear 44 is rotated and eccentrically pulled by the pull rod 50, the intermediate base 20 having the pivotal shaft 23 acting as a pivot will be actuated to swing left and right obliquely, as shown in FIGS. 9 to 12. The pull rod 50 can be adjusted in length so as to adjust the slanting extent of swinging left and right of the intermediate base 20 and the seat plate 30.

After the riding device is assembled, as shown in FIG. 1, it can be driven to produce different movements described as follows.

1. When the motor 41 is started, the first, the second and the third gear 42, 43, 44 will be driven to rotate synchronously. At the same time, the crank 45 connected with one end of the shaft 430 of the second gear 43 and having its extending end pivotally connected with the connecting rod 46 will be actuated to rotate and the connecting rod 46 will actuate the pivotal point 47 to move back and forth and swing up and down. Simultaneously, the seat plate 30 pivotally connected on the pivotal point 47 is actuated to swing back and forth and swing up and down, as shown in FIGS. 5 to 8.

2. Since the pull rod 50 is connected with an eccentric portion of one end of the shaft 440 of the third gear 44 and has its upper and lower end respectively provided with a universal bearing, when the shaft 440 of the third gear 44 is rotated, its eccentric portion will be pulled by the pull rod 50, and the eccentrically connecting position of the pull rod 50 and the shaft 440 will be altered. Thus, the intermediate base 20 and the seat plate 30, which have the pivotal shaft 23 acting as a pivot, can be actuated to swing left and right obliquely, as shown in FIGS. 9 to 12.

3. The gear ratio between the third and the second gear 44, 43 is two to one; therefore, when the second gear is rotated for two circles, the third gear 44 is only rotated for one circle. Thus, when the seat plate 30 swings back and forth a first time, it will swing obliquely to one side, and when the seat plate 30 swings back and forth a second time, the seat plate 30 will swing obliquely to the other side, that is, when the seat plate 30 swings back and forth twice, it will swing left and right only once. Obviously, the riding device of this invention can be actuated to swing back and forth, swing up and down and swing left and right obliquely at the same time, letting a rider feel as if he/she were on the horseback of a real horse.

While the preferred embodiment of the invention has been described above, it will be recognized and understood that various modifications may be made therein and the appended claims are intended to cover all such modifications that may fall within the spirit and scope of the invention.

I claim:

1. A riding device comprising:
    a bottom base able to be placed on a flat surface;
    an intermediate base positioned on said bottom base, said intermediate base having its front and rear end pivotally combined with said bottom base, said intermediate base having the opposite sides of its front and rear end respectively and pivotally connected with two front swing arms and two rear swing arms;
    a seat plate positioned over said intermediate base, said seat plate having four corners respectively provided with a connecting lug extending downward, said four connecting lugs respectively and pivotally connected with the upper ends of said front and said rear swing arms, said seat plate having its four corners held upward by said front and said rear swing arms, said seat plate provided with a cushion on its topside for a user to sit thereon;
    a transmission unit fixed on said intermediate base, said transmission unit provided with a motor for driving a first gear, a second gear and a third gear to rotate synchronously, said second gear and third gear having respective second and third shafts, said second gear having one end of its shaft secured with a crank, said crank having its extending end pivotally connected with a connecting rod, said connecting rod having the other end pivotally connected with the pivotal joint of one of said swing arms and said connecting lug to form a pivotal point;
    a pull rod having its lower end connected with a positioning point of said bottom base, said pull rod having its upper end connected with an eccentric portion of one end of the shaft of said third gear, said pull rod having its upper and lower turning end respectively provided with a universal bearing, said universal bearings preventing said pull rod from rotating together with said third gear; and
    said seat plate able to be actuated to swing back and forth, swing up and down and swing left and right obliquely.

2. The riding device as claimed in claim 1, wherein the gear ratio between said second gear and said third gear is one to two.

3. The riding device as claimed in claim 1, wherein said pull rod can be adjusted in length for altering the slanting extent of swinging left and right of said seat plate.

4. The riding device as claimed in claim 1, wherein said connecting rod has its extending end pivotally connected with the upper end of said rear swing arm.

* * * * *